2 Sheets—Sheet 1.

L. A. ASPINWALL.

POTATO CUTTER.

No. 11,417. Reissued Apr. 24, 1894.

Witnesses

Chas. H. Smith

J. Stait

Inventor

L. A. Aspinwall per Lemuel W. Serrell

Atty.

2 Sheets—Sheet 2.

L. A. ASPINWALL.

POTATO CUTTER.

No. 11,417. Reissued Apr. 24, 1894.

Witnesses
Chas. H. Smith
J. Stair

Inventor
L. A. Aspinwall
per
Samuel W. Serrell
Atty.

UNITED STATES PATENT OFFICE.

LEWIS AUGS. ASPINWALL, OF JACKSON, MICHIGAN, ASSIGNOR TO THE ASPINWALL MANUFACTURING COMPANY, OF SAME PLACE.

POTATO-CUTTER.

SPECIFICATION forming part of Reissued Letters Patent No. 11,417, dated April 24, 1894.

Original No. 485,160, dated November 1, 1892. Application for reissue filed December 22, 1893. Serial No. 494,477.

*To all whom it may concern:*

Be it known that I, LEWIS AUGUSTUS ASPINWALL, a citizen of the United States, formerly residing at Three Rivers, in the county of St. Joseph and State of Michigan, but now residing at Jackson, in the county of Jackson and State of Michigan, have invented an Improvement in Potato-Cutters, of which the following is a specification.

The object of this improvement is to cut the potato longitudinally and transversely at one operation, so that the eyes may be properly separated for the seed, and the parts are constructed with reference to the reception of potatoes of varying sizes, and the knives are placed in the peculiar manner hereinafter described, so that the pieces of potato do not become wedged between them.

Figure 1:
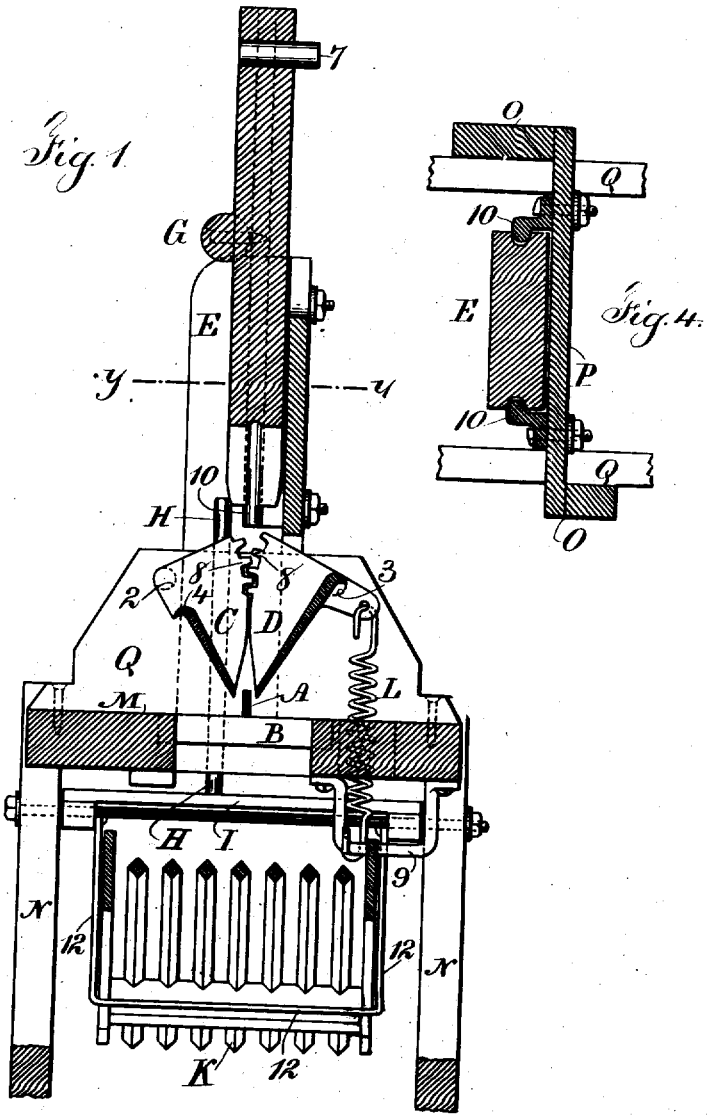
Figure 2:
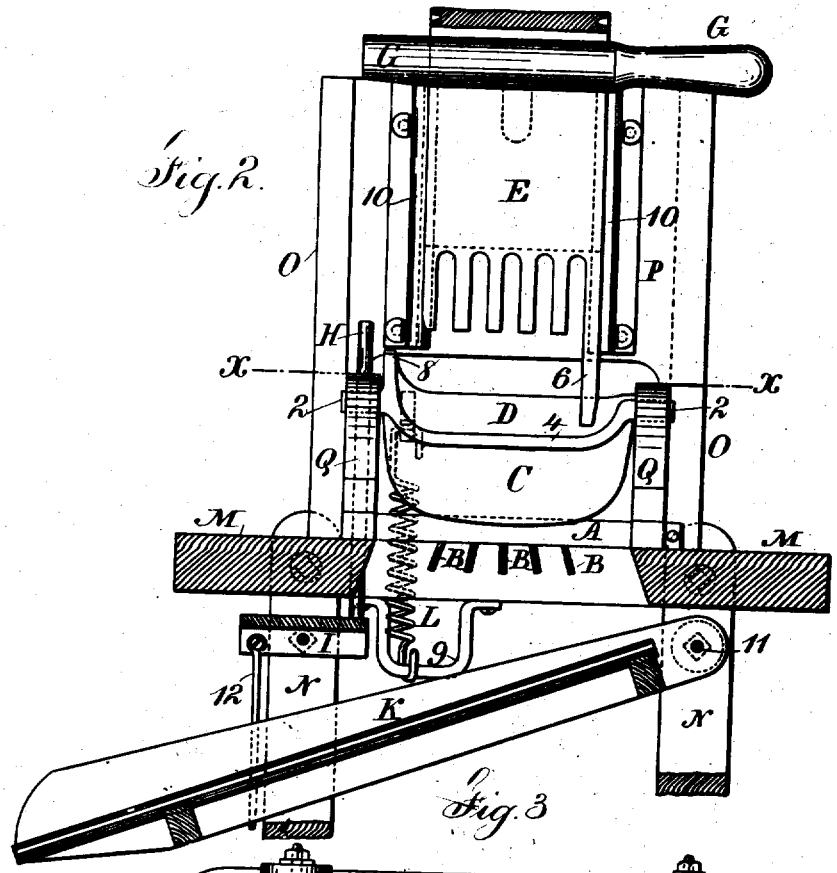
Figure 3:
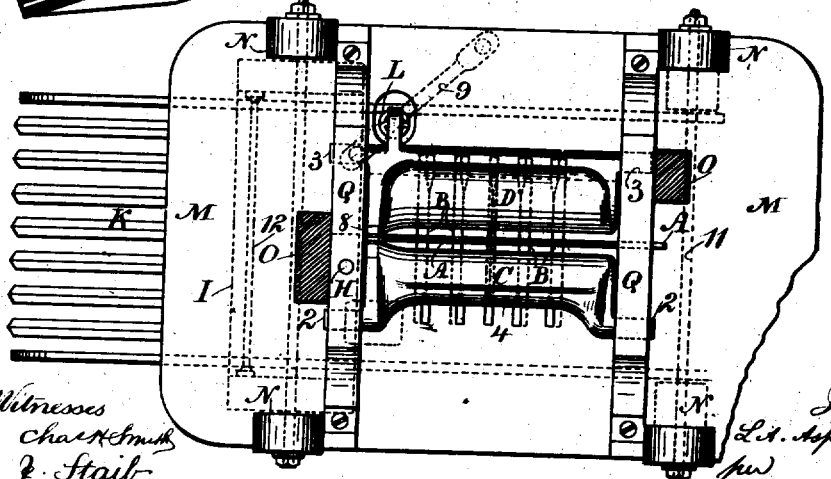

In the drawings, Figure 1. is a vertical cross-section of the machine. Fig. 2. is an elevation with the bed partly broken open. Fig 3. is a sectional plan at the line *x. x.* Fig. 2. and Fig. 4. is a section at the line *y. y.* Fig. 1.

A suitable table M. is provided upon legs N. or other supports, and above the table the frame O. is provided with the cross-piece P. and hopper ends Q. all of which are permanently connected together and to the table or bed, and between the hopper ends Q. are the hopper-jaws C. and D. pivoted at 2. and 3. respectively, to the hopper ends, and there are upon the adjacent edges of the hopper-jaws gear-segments 8. which connect the jaws together, so that they swing in opposite directions simultaneously, and there is a spring L. connected with an arm upon one of the jaws, so as to act to move the lower edges of the jaws toward each other, and such spring L. is preferably helical and passed through a hole in the table M. to a bracket-arm 9. so as to obtain the desired length of spring for the proper elasticity. These jaws are made with rounding flanges toward the ends, and the jaw C. is cut away at 4. at the front upper edge to give the required room for freely inserting the potato, and the jaws are in their normal position sufficiently near each other at the bottom edges to guide the potato, whether the same is large or small, and as the potato is forced downwardly, as hereinafter described, the jaws yield and open for the discharge of the potato; but they hold the potato centrally in position, because both jaws move with uniformity.

Immediately below the jaws is the central longitudinal knife A. with the edge upwardly, and such knife rests at its ends upon the table M. and it passes through the hopper ends Q. and is sustained by them, and it is advantageous to provide in the end of such knife a hole to facilitate the drawing out of the knife for sharpening.

In the table or bed M. is a central opening, across which are transverse knives B. at suitable distances apart for separating the potato into the required sizes of pieces, and these transverse knives are received at their ends into slots, and instead of being placed vertical, as has heretofore sometimes been the case, the central knife is vertical, or nearly so, and the knives at each side diverge at the backs, so as to occupy nearly radial positions from an imaginary center six or eight inches above the central knife, the object being to provide spaces between the knives that widen downwardly, notwithstanding the fact that the knives are thicker at the lower or back edges than they are at the top or cutting edges. By this means the pieces of potato as they are cut by the knives fall freely away from the knives, and in the cutting operation the pieces of potato are not compressed or bruised by being passed through narrower spaces than the cutting edges.

Upon the cross-piece P. there are vertical slideways 10. for the reception of the plunger E. to which is attached a handle G. for raising and lowering the plunger with facility, and it is advantageous to provide a stop 7. upon the plunger, which, coming in contact with the frame P. arrests the downward movement of the plunger at the proper point. The lower end of the plunger is slotted longitudinally and transversely, so as to form fingers, the slots being in such positions that the longitudinal knife A. passes into the longitudinal slot and the transverse knives pass into the transverse slots, the fingers passing freely down between the knives.

Below the table M. is an inclined screen K.

preferably formed of a series of longitudinal diamond-shaped bars, and the screen is pivoted at 11. and it is hung by rods 12. to a rocker lever I. and there is a plug H. passing loosely through one of the hopper ends and resting upon one side of the rocker, so that when the handle G. and plunger E. are pressed downwardly the plug H. receives a sudden blow or concussion and gives to the rocker I. and screen K. a shaking motion to facilitate the movement of the cut potatoes down such screen.

The operation of this machine is as follows: The potato to be cut is placed longitudinally into the hopper, preferably with the left hand, and it is advantageous to bring the seed end of the potato toward a downwardly projecting stop 6. upon the plunger E. which stop is in such a position in relation to the knives B. that this seed end of the potato is sliced off. The plunger E. is now pressed down by the handle G. and the potato is forced downwardly, the jaws C. D. yielding and the knife A. separating the potato longitudinally and equally, or nearly so, and the knives B. dividing up the halves of the potato transversely into sections of the desired size, and these sections fall freely upon the inclined screen K. and the bars of this screen are at such distances apart that the pieces of cut potato slide down the same and are delivered into a suitable receptacle, and the thin stem and seed end slices of the potato fall through the screen and are kept separate. This latter operation is advantageous because the eyes at the seed end of the potato are usually most numerous and it is desirable not to have them planted. Hence by this improvement the potatoes are not only cut up into pieces of the proper size, but the pieces are separated from the thin end slices or clippings.

It will be apparent that as the handle G. and plunger E. are raised the hopper-jaws swing toward each other ready for the reception of another potato.

I am aware that knives have been constructed so as to diverge from a common center and also that in slicing machines, ranges of parallel knives have been employed and a plunger for the same.

In potato cutting, the best results are obtained by splitting the potato lengthwise and by cutting the same transversely into sections of nearly uniform size. By my improvement the number of pieces into which the potato is cut depends upon the size of the potato, the sections themselves being of approximately uniform size, so that the pieces for planting are more nearly uniform, regardless of the sizes of the potatoes.

I claim as my invention—

1. The combination, in a potato-cutter, of a longitudinal knife having its cutting-edge upwardly with a series of transverse knives crossing below the same and having their upward cutting-edges at the same level and at increasing inclinations from the center, so that the opening through which the potato-sections pass will be as wide near the backs of the knives as at their edges, a hopper for guiding the potatoes to the knives, and a vertical plunger passing between the knives substantially as set forth.

2. The combination, in a potato-cutter, of a table, transverse knives received at their ends into recesses in the table, a longitudinal cutter, hopper-jaws pivoted near their upper edges and having interlocking gear-segments, a spring to press the lower edges of the jaws toward each other, a plunger and handle for moving the same, and vertical slideways for supporting the plunger, substantially as set forth.

3. The combination, with the handle and plunger having a slotted lower end forming fingers, of vertical slideways for the plunger, a table and frame for supporting the same, stationary hopper ends, hopper-jaws pivoted between the stationary ends, a spring to press the lower edges of the jaws toward each other, a longitudinal knife and transverse knives, and a screen below the table for receiving the cut potato-sections, substantially as set forth.

4. The combination, in a potato-cutter, with the stationary knives, of a movable plunger slotted at its lower end to form fingers, hopper-jaws having rounded ends and interlocking gear-segments, and a spring to press the lower edges of the jaws toward each other, the upper edge of the front jaw being removed to facilitate the insertion of the potato, substantially as set forth.

5. The combination, in a potato-cutter, with the stationary knives and movable plunger, of a yielding hopper into which the potato is passed and a stop for the end of the potato to determine the position of the same in relation to the stationary knives, substantially as set forth.

6. The combination, in a potato-cutter, of a hopper, longitudinal and transverse knives, a plunger slotted at its lower end to form fingers for pressing the potato against and between the cutting-knives, an inclined screen upon which the potato-sections fall, and an agitating device receiving its motion from the plunger for shaking the screen, substantially as set forth.

7. The combination in a potato cutter, of a cutter for separating the potato longitudinally, crossing cutters for separating the potato transversely into sections of approximately the same size regardless of the length of the potato, means for directing the potato to the longitudinal knife, and a plunger slotted at its lower end to correspond to the knives for forcing the potato through the cutting knives, substantially as set forth.

8. The combination in a potato cutter with the longitudinal knife and crossing knives and supports for the knives, of a yielding hopper to present the potato to the longitudinal knife, a plunger slotted at its lower end to correspond to the knives for pressing the potato from the hopper through the knives, substantially as set forth.

9. The combination in a potato cutter, of a longitudinal knife and crossing knives for cutting the potato longitudinally and transversely, a yielding hopper for receiving the potato and guiding the same to the knives, a plunger slotted at its end to correspond to the knives for forcing the potato from the hopper through the knives, and an inclined screen upon which the potato sections fall, substantially as set forth.

10. The combination in a potato cutter, of a supporting table, a longitudinal knife and a range of crossing knives supported by the table with their edges upwardly, means for guiding the potato to the longitudinal knife, a moving plunger grooved at its end to correspond to the knives and acting to force the potato through between such knives, substantially as set forth.

Signed by me this 15th day of December, 1893.

L. AUGS. ASPINWALL.

Witnesses:

WALTER ALEXANDER,
C. G. RAWLEY.